(12) United States Patent
Welch et al.

(10) Patent No.: US 8,754,750 B2
(45) Date of Patent: Jun. 17, 2014

(54) VEHICLE MOUNTED DIRECTIONALLY FOCUSED TOLLING DEVICE ENCLOSURE

(75) Inventors: Rick Welch, Harwinton, CT (US);
Marshall B. Viney, Dallas, TX (US);
Kyle Richard Welch, Harwinton, CT (US); Sarath K. Balachandran, Irving, TX (US)

(73) Assignee: Rent A Toll, Ltd., Carrollton, TX (US)

( * ) Notice: Subject to any disclaimer, the term of this patent is extended or adjusted under 35 U.S.C. 154(b) by 527 days.

(21) Appl. No.: 13/163,810

(22) Filed: Jun. 20, 2011

(65) Prior Publication Data

US 2011/0310542 A1    Dec. 22, 2011

Related U.S. Application Data

(60) Provisional application No. 61/356,805, filed on Jun. 21, 2010.

(51) Int. Cl.
| | | |
|---|---|---|
| *H04Q 5/22* | (2006.01) | |
| *G06K 19/00* | (2006.01) | |
| *G06K 19/02* | (2006.01) | |
| *G06K 19/07* | (2006.01) | |
| *H01Q 1/22* | (2006.01) | |
| *G07B 15/06* | (2011.01) | |
| *G06K 19/077* | (2006.01) | |

(52) U.S. Cl.
CPC ............ *G06K 19/005* (2013.01); *G06K 19/025* (2013.01); *G06K 19/0723* (2013.01); *H01Q 1/2216* (2013.01); *G07B 15/063* (2013.01); *G07B 15/06* (2013.01); *G06K 19/07749* (2013.01)

USPC .................... 340/10.1; 340/572.1; 340/572.8; 340/572.3; 365/145; 343/841; 343/872

(58) Field of Classification Search
CPC .............. G06K 19/005; G06K 19/025; G06K 19/0723; G07B 15/063; G07B 15/06; B60R 11/02; G06Q 20/327; H05K 9/00; H04L 67/04; H04L 67/12; H01Q 1/2216
USPC ............... 340/572.1, 10.1, 693.6, 928, 572.8, 340/572.7, 572.3, 10.51; 365/145, 192; 343/841, 872, 713, 868

See application file for complete search history.

(56) References Cited

U.S. PATENT DOCUMENTS

| | | | | |
|---|---|---|---|---|
| 5,767,789 | A * | 6/1998 | Afzali-Ardakani et al. . | 340/10.1 |
| 6,008,727 | A * | 12/1999 | Want et al. ................. | 340/572.1 |
| 6,127,938 | A * | 10/2000 | Friedman ................... | 340/693.6 |
| 6,340,931 | B1 * | 1/2002 | Harrison et al. ........... | 340/572.1 |
| 6,342,830 | B1 * | 1/2002 | Want et al. .................. | 340/10.1 |
| 6,452,507 | B1 * | 9/2002 | Friedman ...................... | 340/928 |
| 7,083,083 | B2 * | 8/2006 | Droz ............................. | 235/375 |
| 7,138,917 | B2 * | 11/2006 | Nishiwaki .................. | 340/572.1 |
| 7,375,631 | B2 * | 5/2008 | Moskowitz et al. ....... | 340/572.1 |
| 7,635,089 | B2 * | 12/2009 | Augustinowicz et al. .... | 235/486 |

(Continued)

*Primary Examiner* — Hoi Lau
(74) *Attorney, Agent, or Firm* — Winstead PC

(57) ABSTRACT

An enclosure for housing a radio frequency integrated device (RFID) transponder. The enclosure includes a front surface comprising a non-shielding material, a top surface, a bottom surface, a right-side surface, a left-side surface and a rear surface. The top surface, the bottom surface, the right-side surface, the left-side surface and the rear surface include a shielding material. The enclosure selectively enables and disables communication between the RFID transponder and toll collection units relative to a position of the front surface of the enclosure within a vehicle.

30 Claims, 7 Drawing Sheets

(56) References Cited

U.S. PATENT DOCUMENTS

| | | | |
|---|---|---|---|
| 7,782,206 B2* | 8/2010 | Burnett et al. | 340/572.1 |
| 8,076,593 B2* | 12/2011 | Centner et al. | 174/382 |
| 8,228,199 B2* | 7/2012 | Noakes et al. | 340/572.3 |
| 2003/0214406 A1* | 11/2003 | Epstein | 340/572.8 |
| 2006/0017570 A1* | 1/2006 | Moskowitz et al. | 340/572.7 |
| 2006/0187055 A1* | 8/2006 | Colby | 340/572.7 |
| 2006/0187061 A1* | 8/2006 | Colby | 340/572.8 |
| 2006/0290501 A1* | 12/2006 | Hammad et al. | 340/572.1 |
| 2007/0040679 A1* | 2/2007 | Klosinski | 340/572.1 |
| 2007/0063847 A1* | 3/2007 | Lee et al. | 340/572.1 |
| 2008/0284606 A1* | 11/2008 | Liu et al. | 340/572.7 |
| 2009/0146814 A1* | 6/2009 | Hammad et al. | 340/572.1 |
| 2009/0243858 A1* | 10/2009 | Burnett et al. | 340/572.3 |
| 2009/0248500 A1* | 10/2009 | Centner et al. | 705/13 |
| 2010/0188693 A1* | 7/2010 | Dan | 358/1.15 |
| 2010/0194542 A1* | 8/2010 | Noakes et al. | 340/10.1 |
| 2010/0232132 A1 | 9/2010 | Centner | |
| 2010/0308971 A1* | 12/2010 | Burnett et al. | 340/10.1 |
| 2011/0050398 A1 | 3/2011 | Centner | |
| 2011/0310542 A1* | 12/2011 | Welch et al. | 361/679.01 |
| 2012/0081211 A1* | 4/2012 | Centner et al. | 340/10.1 |

* cited by examiner

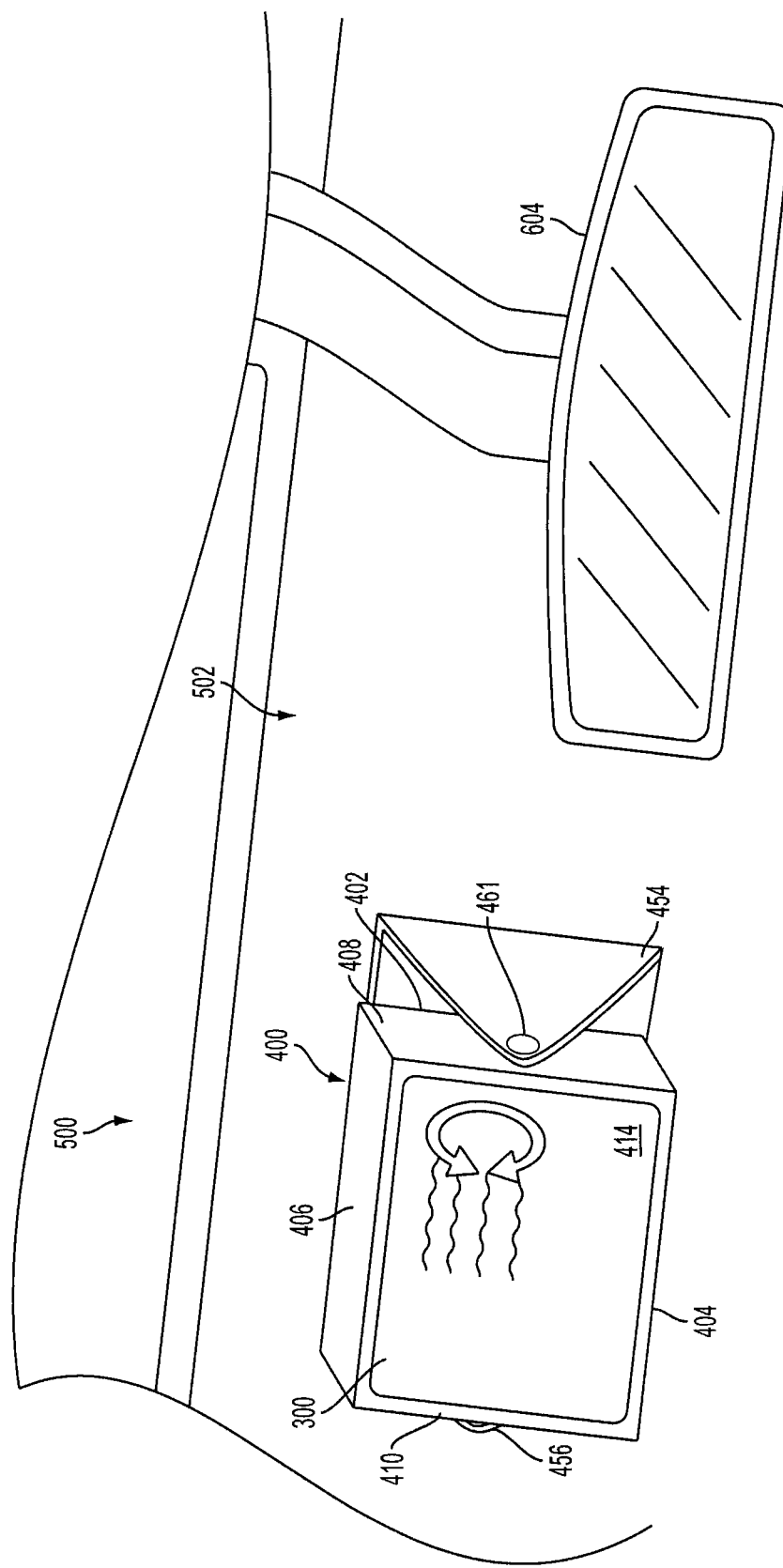

VEHICLE MOUNTED DIRECTIONALLY FOCUSED TOLLING DEVICE ENCLOSURE

CROSS-REFERENCE TO RELATED APPLICATIONS

This patent application claims priority from, and incorporates by reference, U.S. Patent Application No. 61/356,805, filed on Jun. 21, 2010.

BACKGROUND OF THE INVENTION

1. Technical Field

The present invention relates to an enclosure for housing a toll fee tracking device and, more particularly, but not by way of limitation, to an enclosure that selectively enables and disables communication between the toll fee tracking device and toll collection units at toll stations.

2. History of Related Art

The crowding of highways within metropolitan areas has resulted in the development of additional traffic arteries known as toll roads. Toll roads have become increasingly popular, however, they require payment of a toll fee for use. Collection of tolls by conventional means, such as, for example, manned toll stations has had a negative effect upon highway throughput and safety. Congestion and long backups on toll stations are becoming more common. Such conditions involve a significant economic cost, through lost time and reduced productivity. Moreover, serious accidents at toll stations, caused by vehicle operators or mechanical failures, have also increased in frequency.

Certain toll authorities have attempted to respond to these problems by providing coin-operated toll collection devices, or by instituting a toll-plate system in which toll-takers visually inspect each incoming vehicle for an appropriate toll plate or sticker. Coin operated toll collection systems, however, do little to increase throughput, and are susceptible to fraud through the use of counterfeit coins. Toll-plate systems suffer the same deficiencies, requiring each vehicle to slow sharply while entering the visual inspection area. In later years, a development ensued that revolutionized toll road travel. This was the development of the toll fee tracking device.

Various automatic toll collection systems have been proposed to reduce dependency on a manual attendant for collection of toll fees that a vehicle operator must present at toll stations. It has been known for some time to provide special tokens which the vehicle operators may deposit at the toll stations without manual intervention, with a deposit and subsequent processing of the token providing the vehicle with a signal allowing the vehicle to pass through the toll station. Such a system disadvantageously requires vehicle operators to periodically buy a supply of such tokens which are generally only usable at the toll stations.

More recently, individually coded electronic transponders are being supplied for mounting to the vehicle. Toll authorities utilize toll transponders such as, for example, EZPASS® for AVI (Automatic Vehicle Identification)/ETC (Electronic Toll Collection) when vehicles use a toll authority. For example, the transponders are typically mounted and exposed on a vehicle windshield and emit signals identifying a particular vehicle as having an active account with the toll authority. The transponders are issued by the toll authority with pre-paid or post-paid accounts assigned. For example, when a vehicle with the transponder passes through an active toll station on a toll road, a payment for the toll transaction is made though the pre-paid or post-paid account previously established and identified by a transponder identification number.

This toll collection system advantageously simplifies a process of collecting tolls, speeds up traffic flow through the toll stations, and reduces the cost of collecting tolls by dispensing with a need to have attendants at toll stations to make a currency exchange with vehicle operators. However, because of the continued presence of the transponder in an activated mode within the vehicle, there may be situations when the vehicle operators prefer not to use the transponder for toll payment. For example, the vehicle operator may want to pay a particular toll with currency rather than have it automatically debited to the pre-paid or post-paid account set up in association with the transponder. Furthermore, an ability to ascertain an identification of the transponder at a location other than the toll station may subject the transponder to improper cloning, or be a basis for privacy concerns. Accordingly, it would be preferable to limit activation of the transponder to situations in which the vehicle operator passing through the toll station desires to utilize the transponder for automatic toll payment.

SUMMARY OF THE INVENTION

The present invention relates to an enclosure for housing a toll fee tracking device. More particularly, one aspect of the invention relates to an enclosure for a toll fee tracking device that selectively enables and disables communication between the toll fee tracking device and toll collection units at toll stations.

An enclosure for housing a radio frequency integrated device (RFID) transponder. The enclosure includes a front surface comprising a non-shielding material, a top surface, a bottom surface, a right-side surface, a left-side surface and a rear surface. The top surface, the bottom surface, the right-side surface, the left-side surface and the rear surface include a shielding material. The enclosure selectively enables and disables communication between the RFID transponder and toll collection units relative to a position of the front surface of the enclosure within a vehicle.

A method for utilizing an enclosure for paying toll fees. The method includes receiving a radio frequency integrated device (RFID) transponder within the enclosure, the enclosure includes a front surface having a non-shielding material, a top surface, a bottom surface, a right-side surface, a left-side surface and a rear surface, the top surface, the bottom surface, the right-side surface, the left-side surface and the rear surface include a shielding material. Responsive to a determination that the vehicle operator chooses to pay the toll fees using the RFID transponder, rotating the enclosure such that the front surface of the enclosure comprising the non-shielding material is facing a front windshield of a vehicle.

An enclosure for housing a radio frequency integrated device (RFID) transponder. The enclosure includes a top surface, a bottom surface, a right-side surface, a left-side surface and a rear surface defining a frontal area for receiving the RFID transponder therein for communication with transponder readers. The top surface, the bottom surface, the right-side surface, the left-side surface and the rear surface include a shielding material. The enclosure selectively enables and disables communication between the RFID transponder and toll collection units relative to a position of the frontal area of the enclosure within a vehicle.

BRIEF DESCRIPTION OF THE DRAWINGS

A more complete understanding of the present invention may be obtained by reference to the following Detailed Description of Illustrative Embodiments of the Invention, when taken in conjunction with the accompanying Drawings, wherein:

FIG. 6A illustrates an enclosure mounted on a windshield of a vehicle and having a front surface facing the vehicle windshield according to an exemplary embodiment.

DETAILED DESCRIPTION OF ILLUSTRATIVE EMBODIMENTS OF THE INVENTION

Embodiment(s) of the invention will now be described more fully with reference to the accompanying Drawings. The invention may, however, be embodied in many different forms and should not be construed as limited to the embodiment(s) set forth herein. The invention should only be considered limited by the claims as they now exist and the equivalents thereof.

Figure 1:
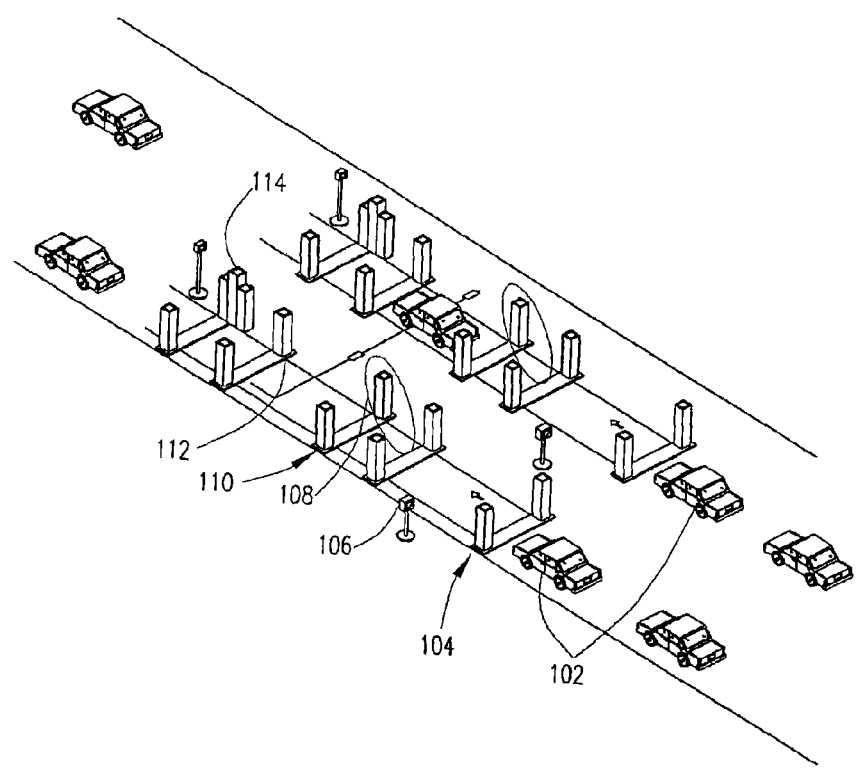
FIG. 1 is a perspective view illustrating an exit of a toll road in which an automatic toll collection system is installed according to an exemplary embodiment.

FIG. 1 illustrates two Electronic Toll Collection (ETC) lanes 102. In each of the ETC lanes 102, tolls are automatically collected from each vehicle along the ETC lanes 102 through radio communication between a toll fee tracking device installed in the vehicle and a toll collection unit installed on each ETC lane 102. In a typical embodiment, the toll fee tracking device may be, for example, a radio frequency integrated device (RFID) transponder. The toll collection units are typically owned by a toll authority and are situated on toll authority property. In a typical embodiment, the toll collection units may be, for example, transponder readers. Those skilled in the art will appreciate that the invention can be practiced in connection with roadways having additional lanes, including multi-lane divided highways, bridges, and tunnels. As one skilled in the art will appreciate, the invention can also be practiced in connection with numerous other transport systems such as, for example, railways and waterways.

On each ETC lane 102, a vehicle type identifying device 104, a license plate monitor camera 106, an antenna 108, a vehicle detector 110, and a display 112 are arranged. The vehicle type identifying device 104 identifies the type of a vehicle passing thereby. The license plate monitor camera 106 captures an image of a license plate of the vehicle to read a license plate number out of the image. The vehicle detector 110 may be, for example, a photoelectric cell for optically sensing the presence of the vehicle and generating a VEHICLE PRESENT signal.

Figure 2:
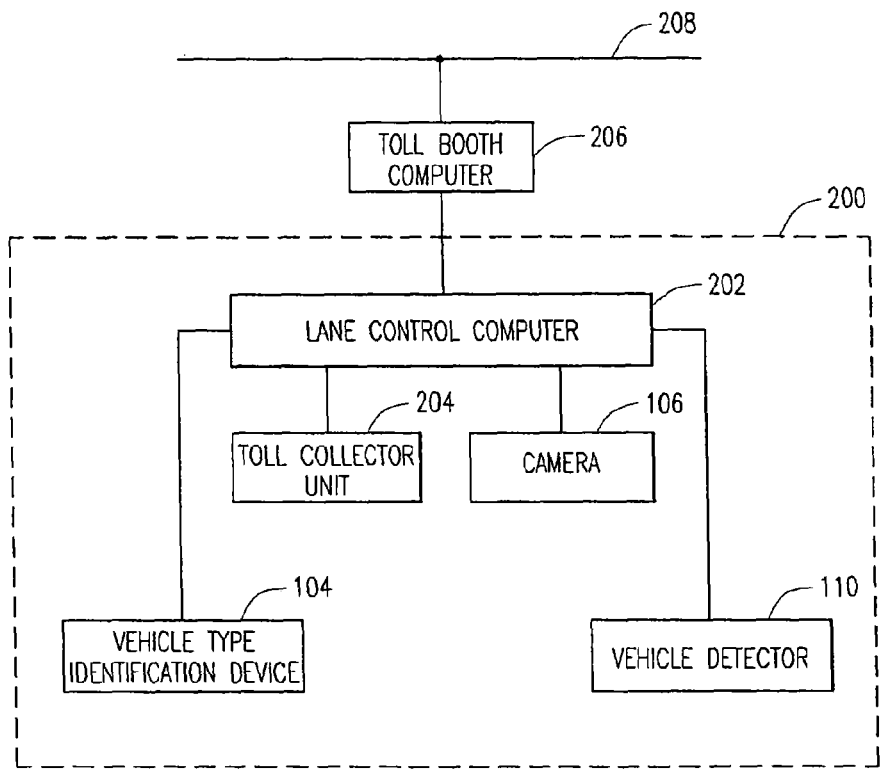
FIG. 2 illustrates a control device installed on an electronic toll collection lane according to an exemplary embodiment.

The automatic toll collection system includes a control device 200, as shown in FIG. 2, one for each ETC lane 102. The control device 200 has a lane control computer 202 which controls operations of the vehicle type identifying device 104, the license plate monitor camera 106, and a toll collecting unit 204. In a typical embodiment, the toll collection unit 204 may be, for example, a transponder reader. Typically, each ETC lane 102 is equipped with one toll collection unit 204 to communicate only with the RFID transponders installed in the vehicles passing through the particular ETC lane 102. The toll collection units 204 are highly sophisticated transponder readers that contain antennas for transmitting radio signals targeting a specific area of the vehicle where the RFID transponders are typically installed such as, for example, a front windshield of the vehicle. The control device 200 receives information signals from the vehicle detector 110 indicating the passing of the vehicle. The lane control computer communicates with a toll booth computer 206. The toll booth computer 206 communicates with a network 208 for transmission of information.

Figure 3A:
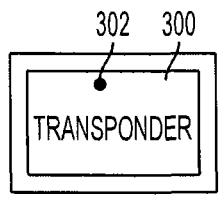
FIG. 3A illustrates a toll fee tracking device according to an exemplary embodiment.

FIG. 3A illustrates a toll fee tracking device. As an exemplary embodiment, a radio frequency integrated device (RFID) transponder is utilized as the toll fee tracking device 300. Each vehicle is identified using the RFID transponder 300. The RFID transponder 300 includes, for example, a microchip attached to an antenna 302. The antenna 302 may be, for example, incorporated into the RFID transponder 300 itself or a receptacle may be provided to attach to a conventional window mounted antenna, similar to those employed in connection with cellular telephone devices. The microchip contains information that identifies a particular vehicle with a toll authority account. Each RFID transponder 300 is identified by a unique identification number (e.g., transponder Id). The RFID transponder 300 further includes circuitry for establishing a radio communication between the RFID transponder 300 and the toll collecting unit through the antenna 302.

Figure 3B:
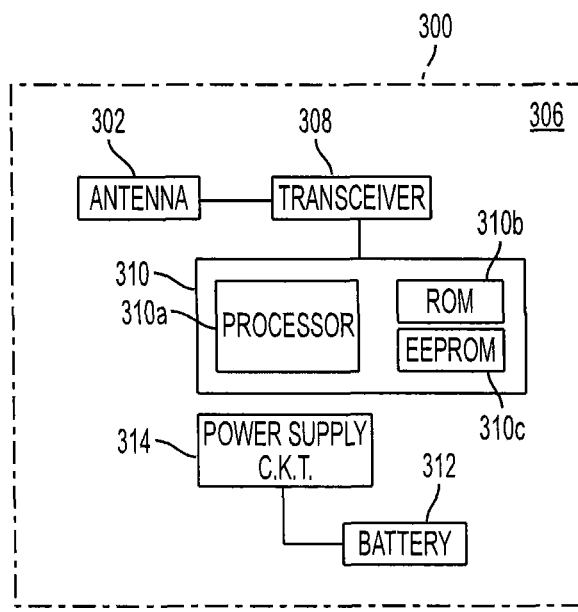
FIG. 3B illustrates a schematic block diagram of a toll fee tracking device according to an exemplary embodiment.

FIG. 3B illustrates a schematic block diagram 306 of the toll fee tracking device 300 (i.e., the RFID transponder 300) as illustrated in FIG. 3A. The RFID transponder 300 includes an antenna 302, a transceiver 308, and a control circuit 310. The transceiver 308 establishes radio communications between the transponder 300 and the toll collection unit 204 (FIG. 2) through the antenna 302. The control circuit 310 further includes a processor 310a, a mask ROM 310b, and an EEPROM 310c. The processor 310a performs various programs stored in the mask ROM 310b. The EEPROM 310c stores therein transponder identification number and status data. The processor 310a may be, for example, an 8086 microprocessor or an 8051 microcontroller, or any other processor capable of executing the functions described above.

The RFID transponder 300 may also includes a battery 312 and a power supply circuit 314. The power supply circuit 314 supplies power to the components of the transponder 300. For exemplary purposes, an RFID transponder 300 powered by a battery 312 is shown. The RFID transponder 300 may be, for example, an active transponder or a passive transponder. According to exemplary embodiments, the RFID transponder 300 is placed within an enclosure located inside the vehicle. In a typical embodiment, the enclosure may be placed inside the vehicle at a location easily accessible by the vehicle operator such as, for example, a vehicle windshield. In a typical embodiment, the enclosure selectively enables and disables radio communication between the transponder and the toll collection units.

Figure 4A:
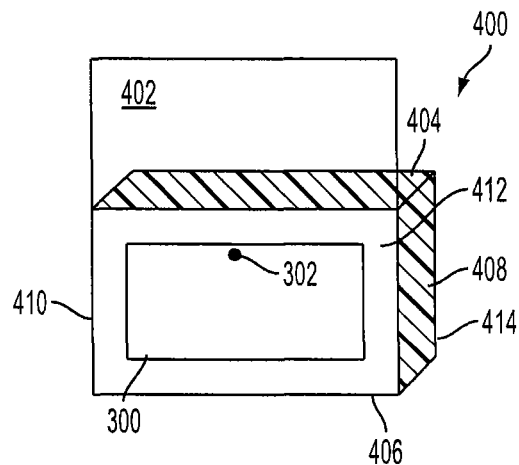
FIG. 4A illustrates an enclosure in an open configuration for housing a toll fee tracking device according to an exemplary embodiment.

FIG. 4A illustrates an enclosure 400 for housing an RFID transponder 300 of FIG. 3A. In the exemplary embodiment illustrated in FIG. 4A, the enclosure 400 is in an open configuration. The enclosure 400 includes a front surface 402, a top surface 404, a bottom surface 406, a right-side surface 408, a left-side surface 410, and a rear surface 414. In a typical embodiment, the top surface 404, the bottom surface 406, the right-side surface 408, the left-side surface 410, and the rear surface 414 form a void 412 for receiving the RFID transponder 300 via the front surface 402. In a typical embodiment, the front surface 402 may be, for example, a panel, a cover, and the like which can be opened to install the RFID transponder 300. In alternate embodiments, the enclosure 400 does not require the front surface 402. According to an exemplary embodiment, the front surface 402 is removably attached to the enclosure 400 via fasteners, such as, for example, screws, nuts, snaps, pins, and the like. For exemplary illustration, the enclosure 400 as illustrated in FIG. 4A is rectangular in shape; however, in alternate embodiments, the enclosure 400 may be of various shapes and sizes to accommodate RFID transponders 300 of all shapes and sizes.

In a typical embodiment, the enclosure 400 comprises a shielding material on all surfaces of the enclosure 400 except the front surface 402. The exemplary enclosure 400 selectively enables and disables radio communication between the RFID transponder 300 and the toll collecting units such as, for example, transponder readers. For example, the shielding material is capable of shielding radio signals emitted and/or received by the RFID transponder 300 and isolates the RFID transponder 300 from communication with circuitry outside the enclosure 400. In a typical embodiment, the shielding material may be, for example, sheet metal, metal screens, metal foams, and the like. In various alternate embodiments, all surfaces of the enclosure 400 except the front surface 402 may be sprayed with metallic ink. The metallic ink consists of a carrier material loaded with a suitable metal, typically copper or nickel in the form of small particulates. Once dry, the metallic ink produces a conductive layer of metal and functions as a shielding material. In a typical embodiment, the front surface 402 of the enclosure 400 comprises non-shielding material that enables communication between the RFID transponder 300 and the transponder readers. In a typical embodiment, the front surface 402 may be formed of clear plastic but non-transparent materials are also contemplated. In alternate embodiments, the front surface 402 is removably attached to the enclosure 400 and can be completely removed from the enclosure 400.

Figure 4B:
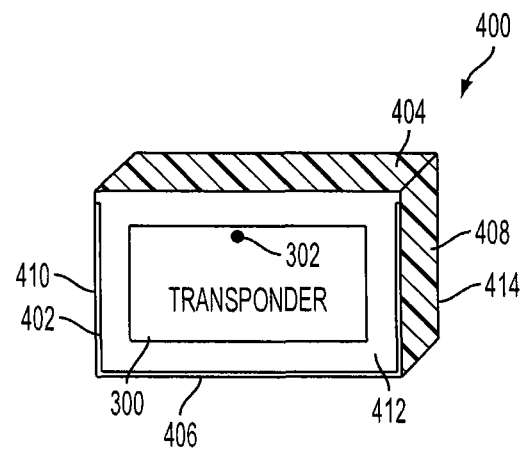
FIG. 4B illustrates an enclosure in a closed configuration for housing a toll fee tracking device according to an exemplary embodiment.

FIG. 4B illustrates an enclosure 400 in a closed configuration. In the exemplary embodiment illustrated in FIG. 4B, an RFID transponder 300 is housed within the enclosure 400. The exemplary enclosure 400 selectively enables and disables communication between the RFID transponder 300 and the transponder readers. In a typical embodiment, the transponder 300 is installed within the enclosure 400 via a fastener. For example, the fastener may be, for example, a hook and pile fastener.

Figure 4C:
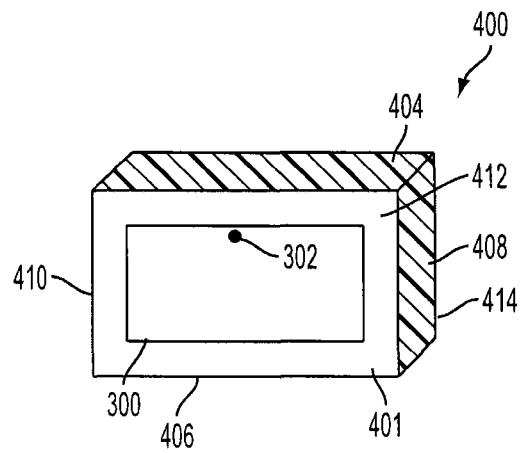
FIG. 4C illustrates an enclosure for housing a toll fee tracking device according to an exemplary embodiment.

FIG. 4C illustrates an enclosure 400 for housing an RFID transponder 300 of FIG. 3A. The enclosure 400 includes a top surface 404, a bottom surface 406, a right-side surface 408, a left-side surface 410, and a rear surface 414. In a typical embodiment, the top surface 404, the bottom surface 406, the right-side surface 408, the left-side surface 410, and the rear surface 414 form a void 412 for receiving the RFID transponder 300 via a frontal area 401. In a typical embodiment, the enclosure 400 comprises a shielding material on all surfaces 404, 406, 408, 410, 414 of the enclosure 400. In the embodiment illustrated in FIG. 4C, the enclosure 400 does not require the front surface 402 (cover and/or panel) as illustrated in FIGS. 4A-4B.

Referring now to FIGS. 4A-4B, in a typical embodiment, the enclosure 400 may be, for example, a box, a holder and the like for housing the RFID transponder 300. In a typical embodiment, the enclosure 400 selectively enables and disables communication between the RFID transponder 300 housed within the enclosure 400 and the transponder readers by way of a position of the enclosure 400 relative to its placement within a vehicle via, for example, manual rotation of the enclosure 400 either horizontally or vertically by the vehicle operator. For example, if the front surface 402 of the enclosure 400 comprising the non-shielding material is facing the vehicle operator, communication between the RFID transponder 300 and the transponder readers is disabled. In such a configuration, when the vehicle passes though the toll facility, the RFID transponder 300 incorporated within the enclosure 400 is in a disabled state and cannot be used for automatic toll payment. In a typical embodiment, the shielding material overlies a signal emitting area and/or a signal receiving area of the RFID transponder 300 to disable communication between the RFID transponder 300 and the transponder readers. According to exemplary embodiments, the enclosure 400 transmits and receives radio signal in only one direction via, for example, the front surface 402 comprising the non-shielding material and restricts the signals from being received or transmitted through the remaining sides of the enclosure 400 comprising the shielding material.

However, if the front surface 402 of the enclosure 400 comprising the non-shielding material is facing the vehicle windshield, communication between the RFID transponder 300 and the transponder readers is enabled because the radio signals emitted from the RFID transponder 300 are allowed to be transmitted outside the enclosure 400 by the non-shielding material on the front surface 402 of the enclosure 400. In such a configuration, when the vehicle passes though the toll facility, the RFID transponder 300 incorporated within the enclosure 400 is in an enabled state and can be used for the automatic toll payment. In this case, the toll station collects the appropriate toll using the RFID transponder 300 incorporated within the enclosure 400 which is installed in the vehicle.

In a typical embodiment, during either the enabled state or the disabled state, the RFID transponder 300 housed within the enclosure 400 is always enclosed within the enclosure 400 and is never exposed. In one embodiment, it may be exposed if the "non-shielding" surface is either not used or removed. The exemplary enclosure 400 does not require drawers, removable covers or manually operable sliding portions for selectively shielding the transponder 300 incorporated within the enclosure 400. Once the RFID transponder 300 is placed in the enclosure 400, only the orientation of the enclosure 400 is related to the use of the RFID transponder 300 for automatic toll payments. As such, the exemplary enclosure 400 does not require drawer mechanisms that are manually opened when it is desired to place the RFID transponder 300 in the enabled state or manually closed when it is desired to place the RFID transponder 300 in the disabled state. In a typical embodiment, the exemplary enclosure 400 is placed in either the enabled state or the disabled state via its orientation through manual rotation of the enclosure 400 either horizontally or vertically by the vehicle operator.

Figure 5A:
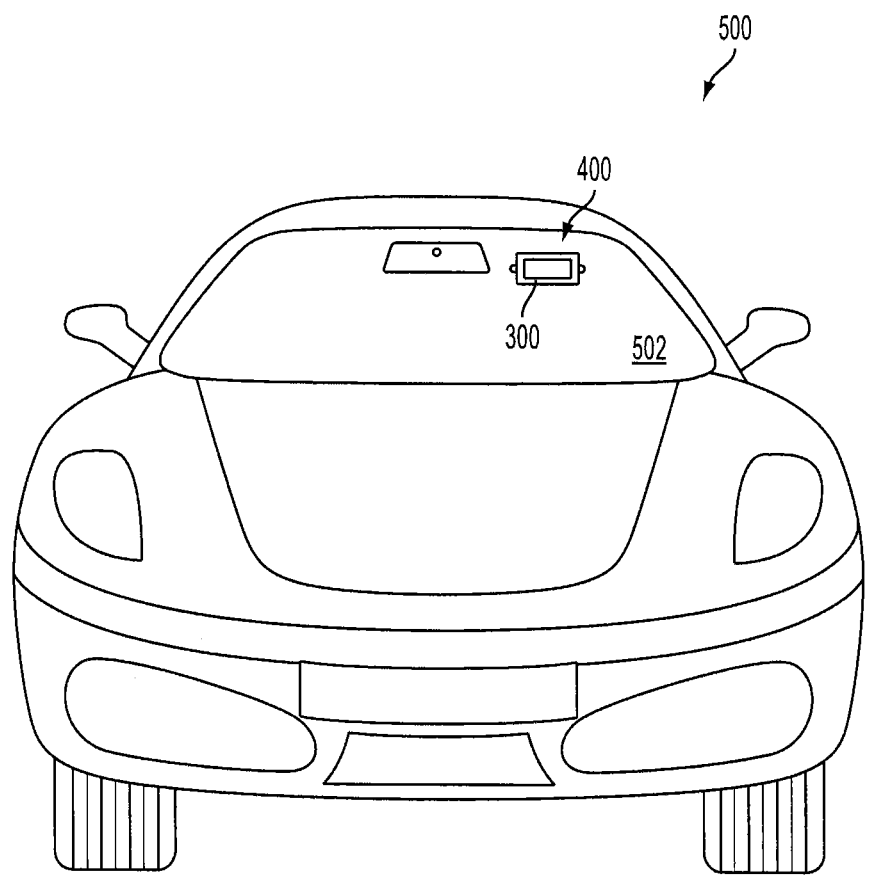
FIG. 5A illustrates an enclosure mounted on an inside region of a vehicle according to an exemplary embodiment.

FIG. 5A illustrates an enclosure 400 mounted on an inside region of a vehicle 500. In a typical embodiment, the enclosure 400 having the RFID transponder 300 incorporated therein is placed inside the vehicle 500 at a location easily accessible by the vehicle operator. In a typical embodiment illustrated in FIG. 5A, the enclosure 400 is placed on a front windshield 502 of the vehicle 500. In a typical embodiment, the enclosure 400 having the RFID transponder 300 incorporated therein is mounted on the front windshield 502 via, for example, a mount assembly (illustrated in FIG. 5B) that allows manual rotation of the enclosure 400 either horizontally or vertically. For exemplary illustration, the enclosure 400 as illustrated in FIG. 5A is mounted on the front windshield 502 of the vehicle 500; however, in alternate embodiments, the enclosure 400 may be mounted on various interior locations of the vehicle 500 such as, for example, a dashboard and any other location that is easily assessable by the vehicle operator.

Figure 5B:
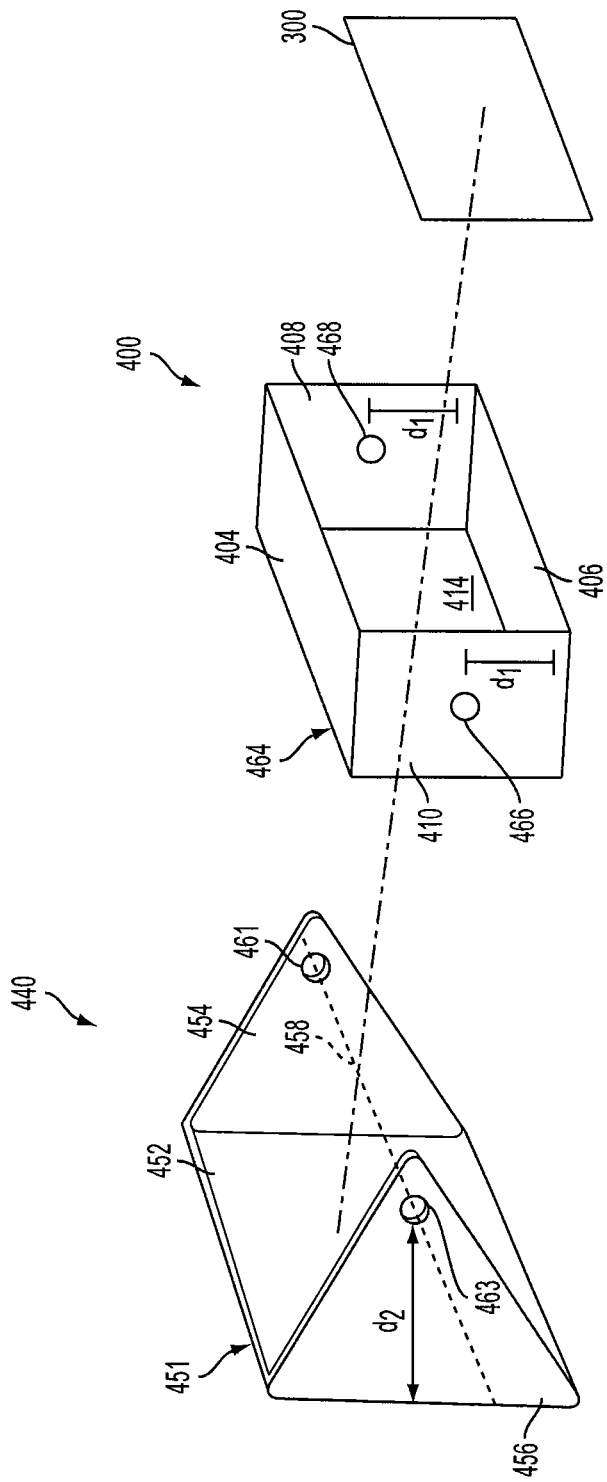
FIG. 5B illustrates an enlarged, exploded, perspective view of an enclosure illustrating one embodiment of an assembly thereof.

Referring now to FIG. 5B, there is shown an enlarged, exploded, perspective view of an enclosure 400 illustrating one embodiment of the assembly thereof. FIG. 5B illustrates a mount assembly 440 that includes a mounting base 451 having a mounting surface 452 from which upstand two oppositely disposed arms 454 and 456 disposed in generally, parallel spaced relationship and having a mounting axis 458 disposed therebetween. The mounting axis 458 extends between the arms 454 and 456 through pivotal mounting areas 461 and 463. The pivotal mounting areas 461 and 463 may comprise apertures, fasteners, shafts, indentations or the like facilitating pivotal mounting of an enclosure frame 464.

The enclosure frame 464, in this particular embodiment, comprises a generally rectangular structure that receives the RFID transponder 300 therein. As shown herein, the enclosure frame 464 is constructed with shielding material as part of the top surface 404, the bottom surface 406, the right-side surface 408, the left-side surface 410, and the rear surface 414. The enclosure frame 464 for this embodiment is open to receive the RFID transponder 300 for securement therein. In a typical embodiment, the RFID transponder 300 is secured within the enclosure 400 via a fastener. For example, the fastener may be, for example, a hook and pile fastener.

In a typical embodiment, the enclosure frame 464 further includes a plurality of attachment tabs 466 and 468. The attachment tabs 466 and 468 are adapted to secure the enclosure frame 464 with the pivotal mounting areas 461 and 463 for facilitating pivotal mounting of an enclosure frame 464. In a typical embodiment, a distance ($d_1$) illustrating a distance between the plurality of attachment tabs 466 and 468 and the bottom surface 406 of the enclosure frame 464 is less than a distance ($d_2$) illustrating a distance between the pivotal mounting areas 461 and 463 and the mounting base 451. Such an arrangement in which the distance ($d_2$) is greater than the distance ($d_1$) allows for manual rotation of the enclosure 400 when attached to the mount assembly 440.

FIG. 6A illustrates an enclosure 400 mounted on a windshield 502 of a vehicle 500 adjacent a rearview mirror 604. In a typical embodiment, the enclosure 400 having an RFID transponder 300 incorporated therein selectively enables and disables radio communication between the RFID transponder 300 and the transponder readers by way of a position of the enclosure 400 relative to placement of the enclosure 400 within a vehicle 601 via, for example, manual rotation of the enclosure 400 either horizontally or vertically. In the exemplary embodiment illustrated in FIG. 6A, the front surface 402 of the enclosure 400 comprising the non-shielding material is facing the vehicle windshield 602 thereby allowing communication between the RFID transponder 300 and the transponder readers. In such a configuration, the RFID transponder 300 is in an enabled state. In the enabled state, the shielding material does not cover the signal emitting and/or receiving area of the RFID transponder 300 thereby enabling communication between the RFID transponder 300 and the transponder readers. In the enabled state, the RFID transponder 300 can be used for automatic toll payment.

Figure 6B:
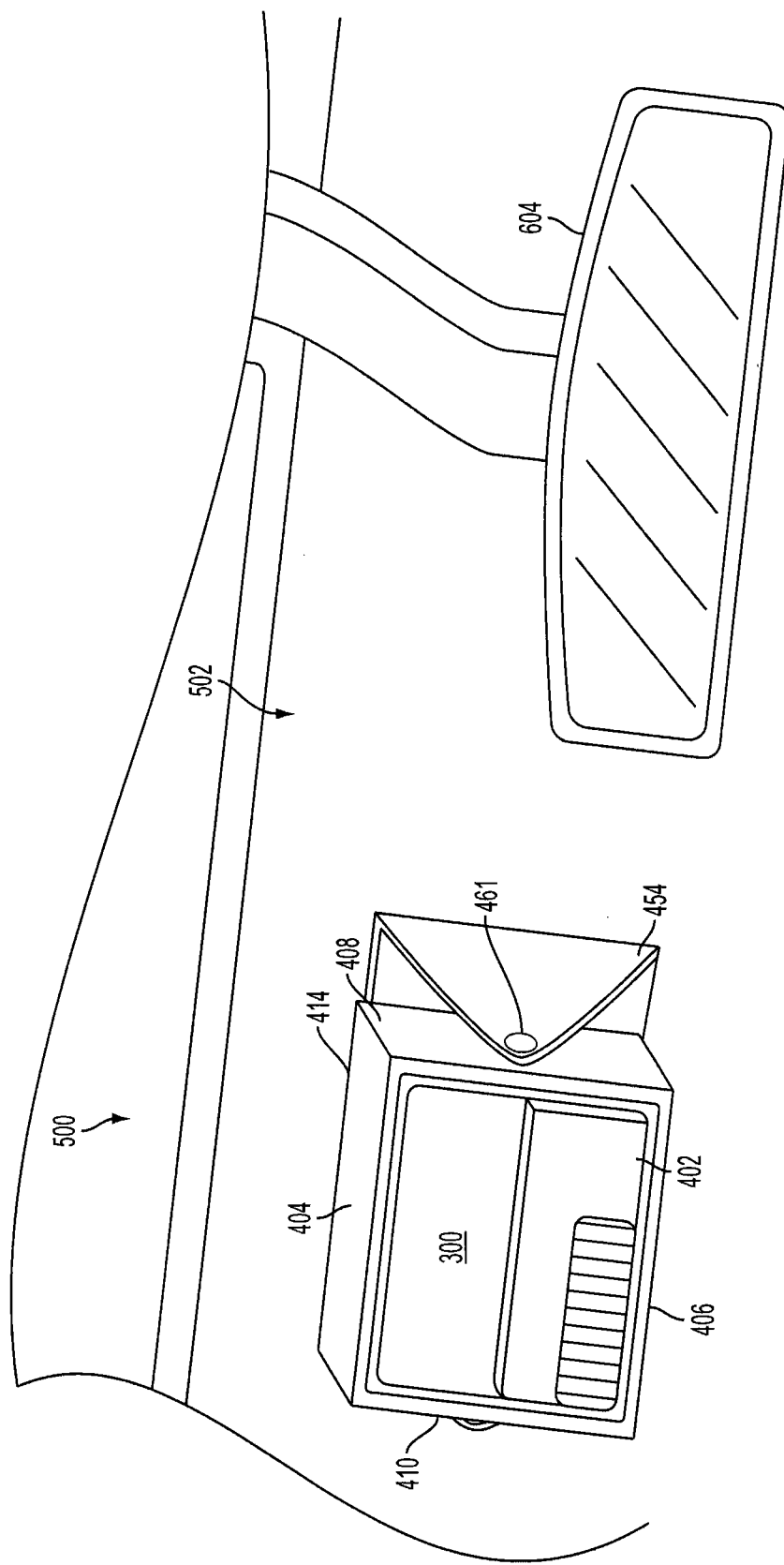
FIG. 6B illustrates an enclosure mounted on a windshield of a vehicle and having a front surface facing a vehicle operator according to an exemplary embodiment.

FIG. 6B illustrates an enclosure 400 mounted on a windshield 502 of a vehicle 500 adjacent a rearview mirror 604. In a typical embodiment, the enclosure 400 having an RFID transponder 300 incorporated therein enables and disables radio communication between the RFID transponder 300 and transponder readers at toll stations by way of a position of the enclosure 400 relative to placement of the enclosure 400 within a vehicle 601 via, for example, manual rotation of the enclosure 400 either horizontally or vertically. In the exemplary embodiment illustrated in FIG. 6B, the front surface 402 of the enclosure 400 comprising the non-shielding material is facing the vehicle operator thereby preventing communication between the RFID transponder 300 and the transponder readers. In such a configuration, the RFID transponder 300 is in a disabled state. In the disabled state, the shielding material overlies the signal emitting and/or receiving area of the RFID transponder 300 thereby disabling communication between the RFID transponder 300 and the transponder readers. In the disabled state, the RFID transponder 300 cannot be used for automatic toll payment.

Referring now to FIGS. 3A-6B, in operation, when the vehicle operator utilizes a toll facility and chooses not to pay toll charges using the RFID transponder 300, the vehicle operator rotates the enclosure 400 (incorporating the RFID transponder 300) either horizontally or vertically such that the front surface 402 of the enclosure 400 comprising the non-shielding material faces the vehicle operator thereby disabling communication between the RFID transponder 300 and the transponder readers. In such a configuration, when the vehicle 500 passes though the toll facility, the RFID transponder 300 incorporated within the enclosure 400 is in a disabled state and cannot be used for the automatic toll payment.

However, when the vehicle operator utilizes the toll facility and chooses to pay toll charges using the RFID transponder 300, the vehicle operator rotates the enclosure 400 (incorporating the RFID transponder 300) either horizontally or vertically such that the front surface 402 of the enclosure 400 comprising the non-shielding material faces the vehicle windshield 502 thereby enabling communication between the RFID transponder 300 and the transponder readers. In such a configuration, when the vehicle 500 passes though the toll facility, the RFID transponder 300 incorporated within the enclosure 400 is in an enabled state and is used for the automatic toll payment.

Embodiments of the present invention require horizontal or vertical rotation of the enclosure 400 for placing the RFID transponder 300 incorporated within the enclosure 400 in an enabled or disabled state. In exemplary embodiments, the RFID transponder 300 is always enclosed within the enclosure 400. The RFID transponder 300 is placed in the enabled state or the disabled state by simply rotating the enclosure 400 (incorporating the RFID transponder 300) either horizontally or vertically. Operation of the exemplary embodiments of the present invention does not require displacement of a shielding material portion of the enclosure 400 relative to the RFID transponder 300.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. An enclosure for housing a radio frequency integrated device (RFID) transponder comprising:
   a front surface comprising a non-shielding material;
   a top surface, a bottom surface, a right-side surface, a left-side surface and a rear surface, wherein the top surface, the bottom surface, the right-side surface, the left-side surface and the rear surface comprise a shielding material; and
   wherein the enclosure selectively enables and disables communication between the RFID transponder and toll collection units relative to a position of the front surface of the enclosure within a vehicle;
   wherein the enclosure selectively enables and disables communication between the RFID transponder and the toll collection units via manual rotation of the enclosure by a vehicle operator; and
   wherein, when the front surface of the enclosure comprising the non-shielding material is facing the vehicle operator, communication between the RFID transponder and the toll collection units is disabled.

2. The enclosure of claim 1, wherein, when the front surface of the enclosure comprising the non-shielding material is facing a front windshield of the vehicle, communication between the RFID transponder and the toll collection units is enabled.

3. The enclosure of claim 1, wherein the enclosure selectively enables and disables communication between the RFID transponder and the toll collection units via vertical rotation of the enclosure by a vehicle operator.

4. The enclosure of claim 1, wherein the enclosure selectively enables and disables communication between the RFID transponder and the toll collection units via horizontal rotation of the enclosure by a vehicle operator.

5. The enclosure of claim 1, wherein the enclosure is mounted on a front windshield of the vehicle via a mount assembly.

6. The enclosure of claim 1, wherein the enclosure is mounted on a dashboard of the vehicle via a mount assembly.

7. The enclosure of claim 1, wherein the enclosure is mounted towards a front region of the vehicle that is easily assessable by a vehicle operator.

8. The enclosure of claim 1, wherein the shielding material comprises a material that isolates the RFID transponder from communication with the toll collection units.

9. The enclosure of claim 8, wherein the shielding material comprises at least one of sheet metal, metal screens, metal foams and metallic ink.

10. The enclosure of claim 1, wherein the non-shielding material comprises plastic.

11. The enclosure of claim 1, wherein the RFID transponder is completely enclosed within the enclosure.

12. The enclosure of claim 1, wherein the enclosure does not require a manual operable sliding portion for selectively shielding the RFID transponder housed within the enclosure.

13. The enclosure of claim 1, wherein the enclosure is rectangular shaped.

14. The enclosure of claim 1, wherein, when the front surface of the enclosure comprising the non-shielding material is facing a vehicle operator, the RFID transponder is in a disabled state.

15. The enclosure of claim 1, wherein, when the front surface of the enclosure comprising the non-shielding material is facing a front windshield of the vehicle, the RFID transponder is in an enabled state.

16. The enclosure of claim 1, wherein, when a vehicle operator chooses to pay toll charges using the RFID transponder, the vehicle operator rotates the enclosure such that the front surface of the enclosure comprising the non-shielding material is facing a front windshield of the vehicle.

17. The enclosure of claim 1, wherein, when a vehicle operator chooses to not pay toll charges using the RFID transponder, the vehicle operator rotates the enclosure such that the front surface of the enclosure comprising the non-shielding material is facing a vehicle operator.

18. The enclosure of claim 1, wherein the RFID transponder is an active RFID transponder.

19. The enclosure of claim 1, wherein the RFID transponder is a passive RFID transponder.

20. A method for utilizing an enclosure for paying toll fees comprising:
    receiving a radio frequency integrated device (RFID) transponder within the enclosure, the enclosure comprising a front surface comprising a non-shielding material, a top surface, a bottom surface, a right-side surface, a left-side surface and a rear surface, wherein the top surface, the bottom surface, the right-side surface, the left-side surface and the rear surface comprise a shielding material;
    determining if a vehicle operator chooses to pay the toll fees using the RFID transponder; and
    responsive to a determination that the vehicle operator chooses to pay the toll fees using the RFID transponder, rotating the enclosure such that the front surface of the enclosure comprising the non-shielding material is facing a front windshield of a vehicle.

21. The method of claim 20, further comprising:
    responsive to a determination that the vehicle operator chooses not to pay the toll fees using the RFID transponder, rotating the enclosure such that the front surface of the enclosure comprising the non-shielding material is facing the vehicle operator.

22. The method of claim 20, wherein the enclosure selectively enables and disables communication between the RFID transponder and toll collection units relative to a position of the front surface of the enclosure within the vehicle.

23. An enclosure for housing a radio frequency integrated device (RFID) transponder comprising:
    a top surface, a bottom surface, a right-side surface, a left-side surface and a rear surface defining a frontal area for receiving the RFID transponder therein for communication with transponder readers;
    wherein the top surface, the bottom surface, the right-side surface, the left-side surface and the rear surface comprise a shielding material;
    wherein the enclosure selectively enables and disables communication between the RFID transponder and toll collection units relative to a position of the frontal area of the enclosure within a vehicle;
    wherein, when the frontal area of the enclosure comprising a panel of non-shielding material is facing the vehicle operator, communication between the RFID transponder and the toll collection units is disabled; and
    wherein, when the frontal area of the enclosure comprising the panel of non-shielding material is facing a front windshield of the vehicle, communication between the RFID transponder and the toll collection units is enabled.

24. The enclosure of claim 23,
wherein the panel of non-shielding material is secured in the frontal area to completely enclose the RFID transponder within the enclosure.

25. The enclosure of claim 23, wherein a panel of non-shielding material is not secured in the frontal area.

26. The enclosure of claim 23, wherein:
when the frontal area of the enclosure is facing the vehicle operator, communication between the RFID transponder and the toll collection units is disabled; and
when the frontal area of the enclosure is facing a front windshield of the vehicle, communication between the RFID transponder and the toll collection units is enabled.

27. The enclosure of claim 23, wherein the enclosure is mounted on a front windshield of the vehicle via a mount assembly.

28. An enclosure for housing a radio frequency integrated device (RFID) transponder comprising:
a front surface comprising a non-shielding material;
a top surface, a bottom surface, a right-side surface, a left-side surface and a rear surface, wherein the top surface, the bottom surface, the right-side surface, the left-side surface and the rear surface comprise a shielding material;
wherein the enclosure selectively enables and disables communication between the RFID transponder and toll collection units relative to a position of the front surface of the enclosure within a vehicle; and
wherein, when a vehicle operator chooses to pay toll charges using the RFID transponder, the vehicle operator rotates the enclosure such that the front surface of the enclosure comprising the non-shielding material is facing a front windshield of the vehicle.

29. An enclosure for housing a radio frequency integrated device (RFID) transponder comprising:
a front surface comprising a non-shielding material;
a top surface, a bottom surface, a right-side surface, a left-side surface and a rear surface, wherein the top surface, the bottom surface, the right-side surface, the left-side surface and the rear surface comprise a shielding material;
wherein the enclosure selectively enables and disables communication between the RFID transponder and toll collection units relative to a position of the front surface of the enclosure within a vehicle; and
wherein, when a vehicle operator chooses to not pay toll charges using the RFID transponder, the vehicle operator rotates the enclosure such that the front surface of the enclosure comprising the non-shielding material is facing a vehicle operator.

30. An enclosure for housing a radio frequency integrated device (RFID) transponder comprising:
a front surface comprising a non-shielding material;
a top surface, a bottom surface, a right-side surface, a left-side surface and a rear surface, wherein the top surface, the bottom surface, the right-side surface, the left-side surface and the rear surface comprise a shielding material;
wherein the enclosure selectively enables and disables communication between the RFID transponder and toll collection units relative to a position of the front surface of the enclosure within a vehicle; and
wherein, when the front surface of the enclosure comprising the non-shielding material is facing a vehicle operator, the RFID transponder is in a disabled state.

* * * * *